United States Patent [19]
Mattei et al.

[11] Patent Number: 5,246,649
[45] Date of Patent: Sep. 21, 1993

[54] METHOD OF COATING COMPOSITE MATERIAL PARTS WITH A REFRACTORY AND/OR METALLIC PRODUCT

[75] Inventors: Jean-Pierre Mattei, La Varenne; Pierre F. Coutin, Paris, both of France

[73] Assignee: R. Alkan & Cie, France

[21] Appl. No.: 717,849

[22] Filed: Jun. 19, 1991

Related U.S. Application Data

[63] Continuation-in-part of Ser. No. 464,109, Jan. 12, 1990, abandoned, which is a continuation-in-part of Ser. No. 6,829, Jan. 21, 1987, abandoned.

[30] Foreign Application Priority Data

Jan. 21, 1986 [FR] France .................. 86 00749

[51] Int. Cl.$^5$ .............................................. C04B 41/50
[52] U.S. Cl. .................................... 264/60; 264/241; 264/258
[58] Field of Search .................. 264/60, 104, 241, 258

[56] References Cited

U.S. PATENT DOCUMENTS

| | | | |
|---|---|---|---|
| 4,465,650 | 8/1984 | Ohno | 264/60 |
| 4,604,249 | 8/1986 | Luhleich | 264/60 |
| 4,629,595 | 12/1986 | Ito | 264/104 |
| 4,737,476 | 4/1988 | Hillig | 264/60 |

*Primary Examiner*—James Derrington
*Attorney, Agent, or Firm*—William A. Drucker

[57] ABSTRACT

The method of coating composite material parts with a refractory and/or metallic product includes the successive steps which consist of applying to the walls of the polymerization mold a layer of a binder which is volatile or decomposable during the polymerization heating, projecting onto said walls at least one layer of said coating products, positioning the fiber and resin fabric layers inside the mold, carrying out polymerization under pressure by heating, and then removing from the mold.

10 Claims, No Drawings

METHOD OF COATING COMPOSITE MATERIAL PARTS WITH A REFRACTORY AND/OR METALLIC PRODUCT

This is a continuation-in-part application of our co-pending application Ser. No. 07/464,109 filed on Jan. 12, 1990 which is a continuation-in-part of Ser. No. 07/006,829, filed on Jan. 21, 1987, both now abandoned.

BACKGROUND OF THE INVENTION

The present invention relates to a method of applying a coating of a refractory and/or metallic product to parts made from a composite fiber-resin material.

It is known, for obtaining such coatings, to apply first, on the walls of the polymerization mold the desired thickness of refractory and/or metallic product with which it is desired to coat the composite material part, then disposing the preimpregnated material in the mold and finally carrying out polymerization conventionally under compression, the transfer of the layer of refractory and/or metallic product to the composite material part obtained then taking place during polymerization.

SUMMARY OF THE INVENTION

The present invention provides a coating method which, starting from the general method above, allows a composite material part to be obtained having a coating of great surface continuity. It also provides for the adherence, on the walls of the mold of any type of coating material and, in particular, of certain so called "cold" projections (as opposed to so called "hot" plasma projections) which are of great service in the case where non metallic molds used are sensitive to heat.

In the present invention, after treating the polymerization mold with a stripping agent, and before projecting the coating material, there is applied to the walls of the mold at ambient temperature a volatile or decomposable binder providing temporary fixing with respect to the stripping agent of the molecules of the coating product to be projected and which, by evaporation or decomposition during polymerization of the preimpregnated material, leaves gaps which the impregnation resin fills, to improve fixing of the coating during hardening of said resin.

In this form the method of the invention is suitable for applying refractory product coatings, but it gives good results which are particularly advantageous for metal coatings including aluminium, copper, nickel-chromium and other metal materials. Because of the excellent surface continuity obtained, the metal coating (aluminium or copper for example) becomes conducting, to provide a desired advantage, for example for protecting coated parts from static electricity or lightening. A particularly advantageous binder is polyvinyl alcohol.

For applying a refractory material coating, the invention proposes adding to the binder a powder charge (or filaments or other dispersion) of the same material as the coating material which will then be hot projected. During this hot projection operation, partial sintering of the projected material takes place not only with itself, but also with the particles predeposited with the binder, which allows a high surface continuity of the final coating to be obtained.

The method for projecting the coating product as well as the evaporation of the binder, in the stop of coating on the internal face side thereof, cause discontinuities or cavities of dimensions greater than those of the particles of the product, but the resin of the composite material penetrates into these discontinuities during application thereof and baking thereof in a vacuum. After hardening, this penetration gives excellent adherence and even causes the coating to be incorporated in the finished part. It has been discovered that polyvinyl alcohol, whose chemical molecule is of a substantially cubic form, is particularly well suited as binder in accordance with the invention for ceramics whose molecular shape is itself substantially cubic.

It will be further noted that the method of the present invention for applying a ceramic coating is separated into two steps including cold deposition, in a binder, of a sublayer of the coating product then hot deposition of the pure coating material, and promotes distribution in the mold, whatever its form, of any type of ceramic material. In this sublayer, such distribution would not be even with certain so called "cold" projections (using an oxy-acetylene gun for example) in opposition to the so called "hot" projections (plasma projection). Now, it so happens that the usefulness of such so called "cold" projections is essential when the molds used are not made from metal, but from plastic or composite materials and are therefore sensitive to the temperature.

The ceramic coatings find numerous applications, in particular for fireproof protection, protection against abrasion and wear and protection against shocks. The coating materials used for this purpose may be more particularly blue corundum or pure alumina. In the particular case where the hot projected coating material is blue corundum, the under layer previously deposited when cold is formed by polyvinyl alcohol charged with titanium alumina powder and the proportion is 0.5 to 5 parts by weight of titanium alumina for one part of polyvinyl alcohol.

To better understand the method of the present invention two examples of use thereof will be described hereafter applying to a part made from a composite fiber-resin material, a coating layer respectively made from metal and from a ceramic material.

EXAMPLE 1

A polymerization mold is cleaned with methylethylketone, then this mold is treated at 90° C. with a non transferable stripping agent applied by brush. This stripping agent comprises:

| | |
|---|---|
| Trichlorotrifluoroethane | 20% |
| Dibutyl esther | 31,5% |
| Aliphatic naphta | 46,5% |
| Ethylene glycol dimethyl ether | 1,5% |
| Polymeric resin | 0,5% | adheres chemically to the surface of the mold without being decomposed at the high polymerization temperatures, and facilitates stripping from the mold. When the mold has cooled to ambient temperature, a fine even layer of a binder product made of polyvinyl alcohol, is applied to its walls using a clean and fluffless cloth. Since this product has the property of being decomposed at the polymerization temperatures, it is necessary to use the above mentioned stripping agent.

Then a layer of aluminium of a maximum thickness of 0,05 mm, serving as a fixing layer for the metal coating product to be projected formed by copper, is flame projected with a continuous alternating movement by means of an oxy-acetylene torch. Then copper is flame projected, still using an oxy-acetylene torch, in regular and successive passes until the desired thickness of copper to be transferred has been obtained. During these projection operations, it is important that the distance between the surface of the mold and the torch be constant and be between 100 and 200 mm. The last projection pass is carried out to obtain a maximum roughness. The polymerizable products are then draped in a conventional way on the mold, which includes the following successive operations:

positioning on the mold layers of fabric of carbon fibers preimpregnated with an expoxy resin, placing on said layers a high temperature fabric coated with a non-transferring release agent, placing on said high temperature fabric a filter consisting of a high temperature film of Halohydrocarbon Polymer, positioning on said filter a fabric of synthetic fiber having high bulk and porosity allowing good air flow, placing on said synthetic fiber fabric a barrier fabric consisting of a high temperature nylon film coated with a rubber base adhesive, positioning on said barrier fabric a drainage fabric made of synthetic fiber, and placing the assembly thus formed under a bag, this assembly being submitted to a suction action to put it under compression (660 millibar).

The polymerization is carried out in an autoclave with an internal pressure of 7 bar and a temperature of 180 degrees C, the operation of transferring the copper and aluminium layer projected on the mold towards the preimpregnated product taking place during polymerization. It is then sufficient to remove the article from the mold to obtain an article made from a composite fiber-resin material coated with copper.

EXAMPLE 2

As in example 1, the polymerization mold is cleaned with methylethylketone, then the said non transferable stripping product is applied at 90° C.

With the mold back at ambient temperature, a solutation of alumina/titanium in polyvinyl alcohol is applied by brush in a proportion by weight of 1 part of alumina/titanium for 1 part of polyvinyl alcohol.

After heating the polymerization mold to a temperature of 70° C. for about 20 minutes blue corundum is flame projected (using an oxy-acetylene torch) in regular and successive passes until the desired thickness is obtained. The composition of the blue corundum projected is the following:

| | |
|---|---|
| $Al_2O_3$ | 94.5% |
| $TiO_2$ | 3.3% |
| $SiO_2$ | 1% |
| $Fe_2O_3$ | 0.2% |
| CaO | 0.1% |
| MgO | 0.15% |
| $Na_2O$ | 0.02% |
| $Mn_3O_4$ | 0.05% |

During this projection, the distance between the surface of the mold and the torch must be kept constant and between 100 and 200 mm, and the last pass is carried out to obtain a maximum roughness.

In the same way as described in example 1, the polymerizable products are draped on the mold, the polymerization is carried out in an autoclave, and it is then sufficient to remove the part from the mold to obtain an article made from a composite fiber-resin material coated with ceramic. A coating is thus obtained having a surface continuity of high quality due to the partial sintering between the projected product and the titanium alumina particles forming the under layer predeposited with the binder.

It will be understood that the above description has been given simply by way of example, without any limitative character, and that additions or modifications could be made without departing from the scope or spirit of the present invention.

What we claim is:

1. A method of coating parts of composite material with a refractory and/or metallic coating product, said method including successive steps which comprise:
    (a) treating walls of a polymerization mold with a non-transferable stripping agent which does not decompose at polymerization temperature;
    (b) applying to said walls of the polymerization mold a layer of a binder which is volatile or decomposable during polymerization heating;
    (c) projecting onto the walls of the polymerization mold at least one layer of a coating product in a refractory and/or metallic material;
    (d) positioning polymerizable products comprising layers of a fiber and resin, fabric inside said polymerization mold;
    (e) carrying out polymerization while said polymerizable products are under compression to produce a polymerized product, and
    (f) removing said polymerized product from said mold.

2. The method as claimed in claim 1 wherein the layer of binder comprises a charge of the same material as the material of the coating roduct to be projected on the walls of the mold.

3. The method as claimed in claim 2, wherein the projected coating product is a refractory ceramic and the charge of the binder is formed by a powder or dispersion of a similar ceramic.

4. The method as claimed in claim 3, wherein the proportion by weight of ceramic in the binder is 0.05 to 5 parts for 1 part of binder.

5. The method as claimed in claim 1, wherein the binder is formed of polyvinyl alcohol.

6. The method as claimed in claim 5, wherein the polyvinyl alcohol is charged with alumina/titanium powder and the projected coating product is formed of blue corundum.

7. The method as claimed in claim 2 wherein the binder is formed of polyvinyl alcohol.

8. The method as claimed in claim 3 wherein the binder is formed of polyvinyl alcohol.

9. The method as claimed in claim 4 wherein the binder is formed of polyvinyl alcohol.

10. The method as claimed in claim 9 wherein the polyvinyl alcohol is charged with alumina/titanium powder and the projected coating product is formed of blue corundum.

* * * * *